Sept. 17, 1940.  C. W. MacMILLAN  2,215,224
HEADLIGHT TESTING DEVICE
Filed Aug. 4, 1938  4 Sheets-Sheet 2
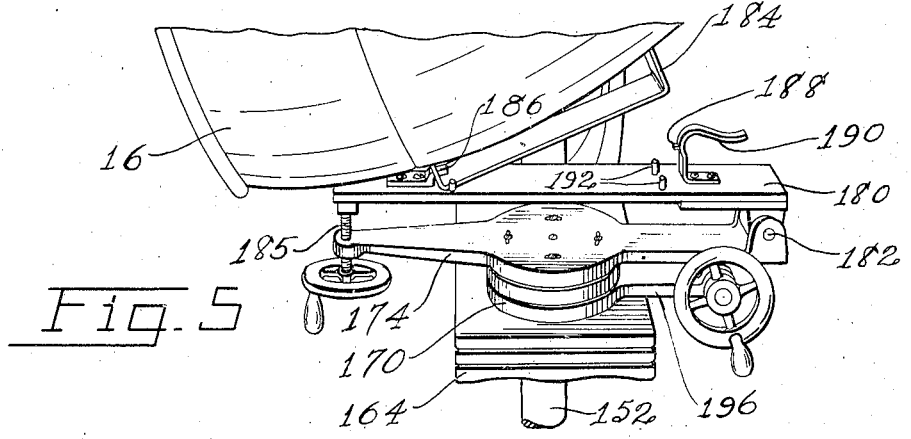
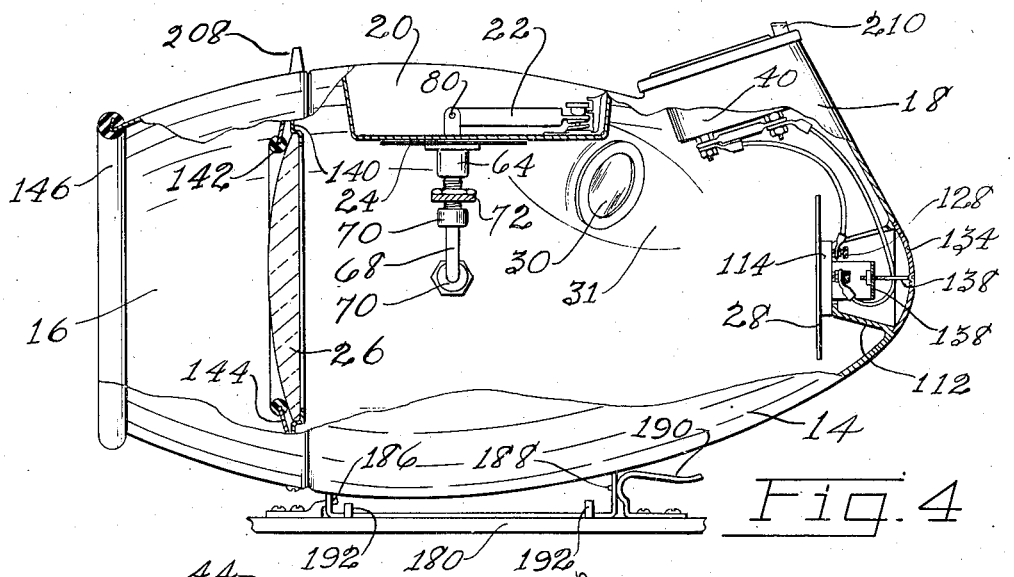
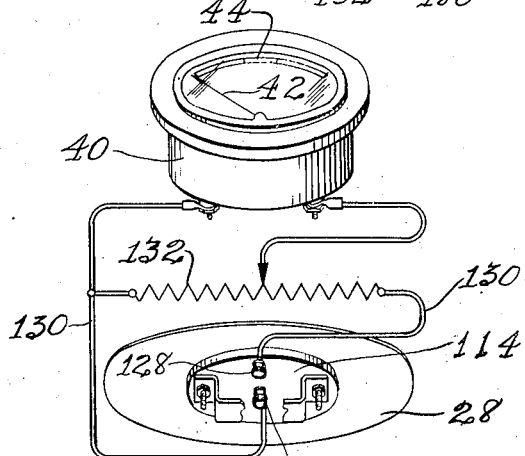
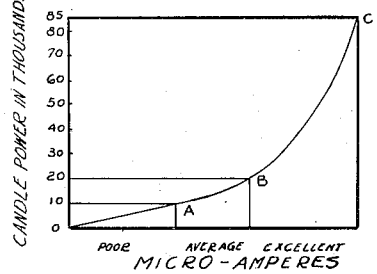
INVENTOR.
CHARLES W. MacMILLAN
BY Parker & Burton
ATTORNEY.

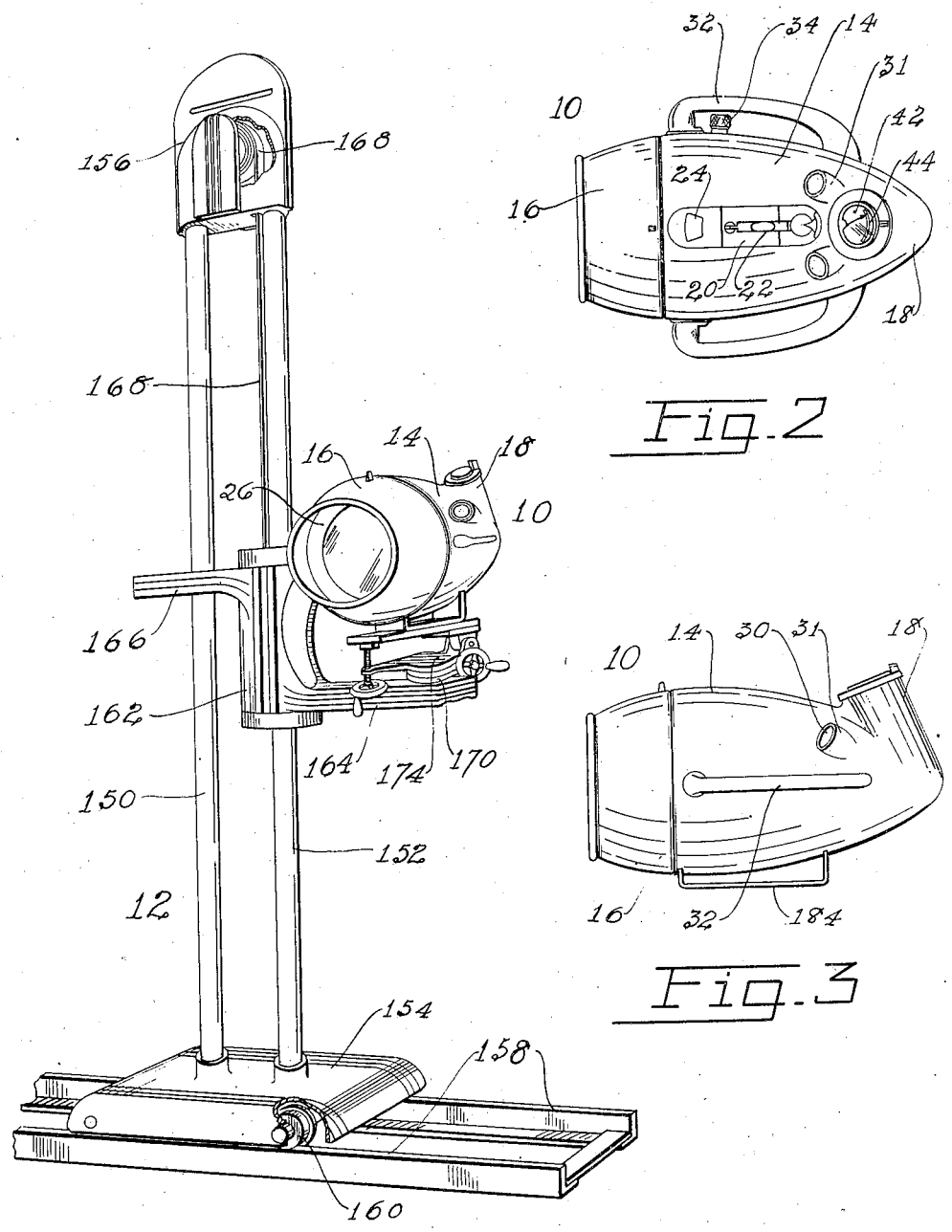

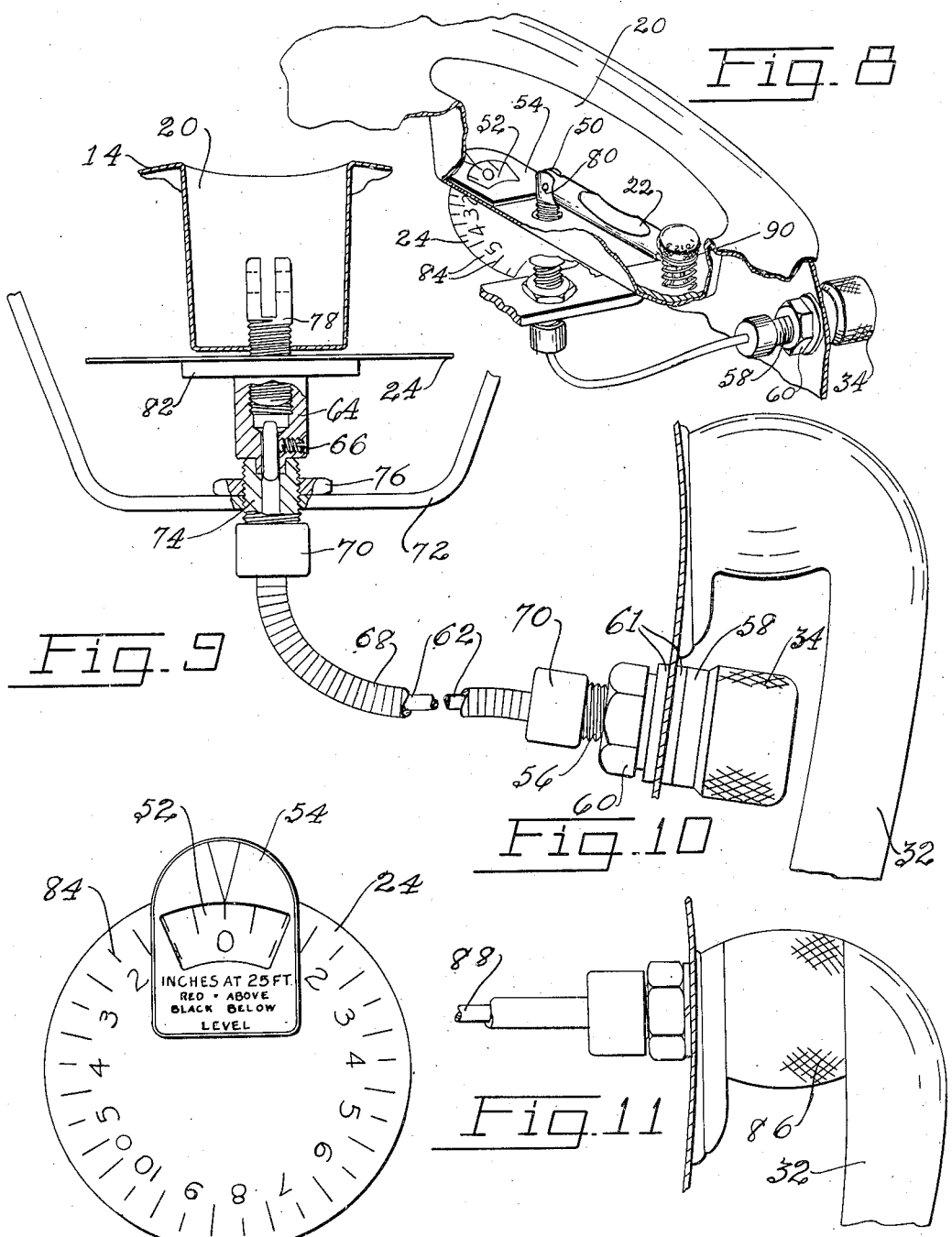

Sept. 17, 1940.  C. W. MacMILLAN  2,215,224
HEADLIGHT TESTING DEVICE
Filed Aug. 4, 1938  4 Sheets-Sheet 4

INVENTOR.
CHARLES W. MacMILLAN
BY Parker & Burton
ATTORNEY.

Patented Sept. 17, 1940

2,215,224

UNITED STATES PATENT OFFICE 2,215,224

HEADLIGHT TESTING DEVICE

Charles W. MacMillan, Detroit, Mich., assignor to Hinckley-Myers Company, Jackson, Mich., a corporation of Michigan Application August 4, 1938, Serial No. 223,015

18 Claims. (Cl. 88—14)

This invention relates to devices for testing headlights of motor vehicles and more particularly to such a device which may be supported upon a frame or portably carried in the hands of the operator to perform the testing operations.

An important object of this invention is to provide a novel headlight testing device which is capable of determining the efficiency as well as the direction of headlight beams and to indicate the amount of correction necessary to bring illumination cast by headlights into the most efficient direction within the limitations imposed by law. The device is compact, accurate and easy to operate. The parts are arranged for economical manufacture and use and delicate parts protected against damage.

Another object of this invention is to provide a compact headlight testing unit or head which is especially constructed for portable use and which when thus used can be regulated without difficulty by the person supporting the device. The testing instrumentalities are housed in a casing or shell of novel design. It is provided with novel hand-holding means for manually supporting the testing head in front of a headlight lens in an accurate steady alignment therewith and novel control means for regulating the testing instrumentalities therein without causing the operator to remove his grasp of the hand holding means.

Another object of this invention is to provide a headlight testing unit or head which may be portably used for testing certain factors of headlight illumination but is also capable of detachable connection to a supporting frame for testing other factors of headlight illumination. The testing head is provided with novel means for quickly attaching the unit to a supporting frame. When thus supported it is capable of being properly aligned with the centerline of the motor vehicle without the necessity of squaring-up the entire supporting frame in front of the motor vehicle. The testing head is movably supported on the frame to accomplish this setting. In the embodiment of the invention described herein the testing head itself carries improved means for measuring the vertical inclination of the headlight beams. On the frame, novel means is employed for testing the lateral deflection of the headlight beams. This is accomplished by the provision of an adjustable indicating means capable of orienting the testing head relative to the motor vehicle preparatory to making the test.

The instrumentality in the testing head for indicating the degrees of vertical inclination of headlight beams forms an important novel provision of the invention. It comprises a level indicating device mounted for pivotal movement relative to the testing head in a vertical plane. A novel remote control system is provided for regulating the position of the level indicating device. Associated with this control is a novel movable member adapted to indicate by its position the degree of inclination of the level indicating device. This member is mounted in the casing for the testing head in position to receive light from the interior of the casing when a headlight beam is condensed therewithin. It is preferably composed of translucent material and carries opaque reference marks. It is exposed to view from the outside of the casing and when the interior of the casing is lighted by a headlight beam directed therewithin, the reference marks are sharply defined against the illuminated background.

An important feature of the invention is found in the novel shape of the housing or casing for the testing devices and the manner of mounting the latter therewithin in exact alignment. Another important feature of the invention resides in the combination visual and electrical test screen provided for indicating accurately the alignment of the test head with the headlight beam. The supporting frame for the test head, including the structural elements for rotating and inclining the test head and for bodily shifting the same horizontally and vertically, constitute important features of the invention. The provision on the frame for zeroizing the scale in order to properly measure the rotatable movement of the test head and its cooperative relation to the sighting means provided on the test head form meritorius features of the invention.

Other objects, advantages, and meritorious features of the invention will become more fully apparent from the following specification, appended claims and accompanying drawings wherein:

Figure 1 is a perspective view of the supporting frame and a test head carried thereon partially broken away to show the interior structure of certain parts.

Fig. 2 is a top view of the test head,

Fig. 3 is a side view of the test head,

Figure 13:
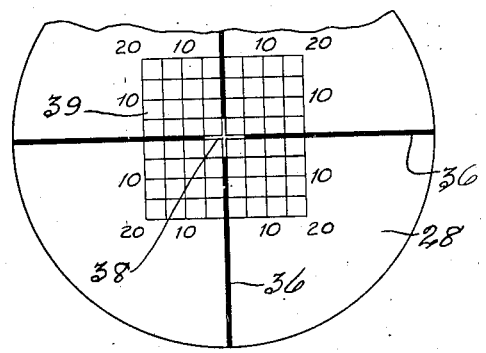
Figure 14:
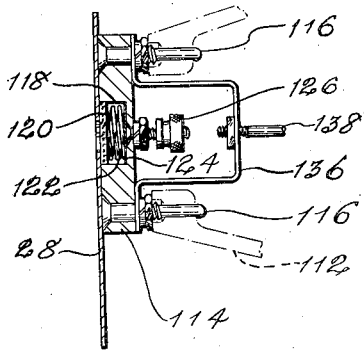
Figure 15:
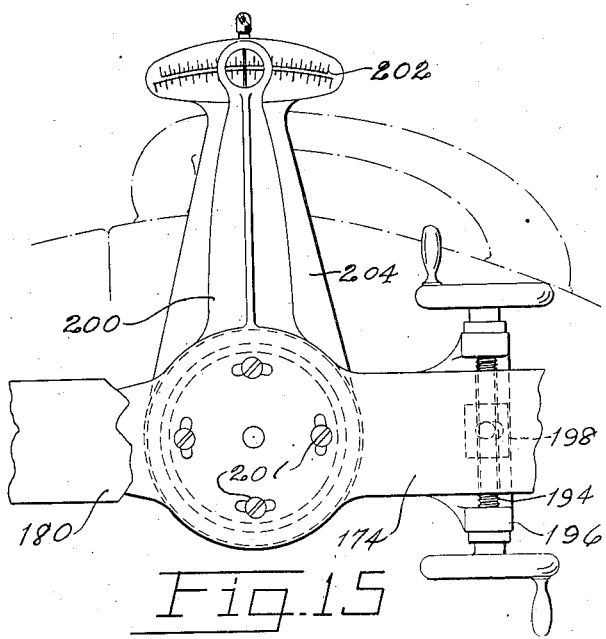
Figure 17:
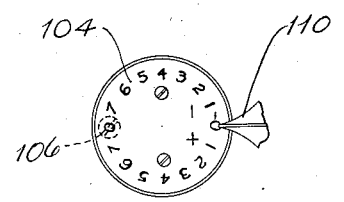
Figure 18:
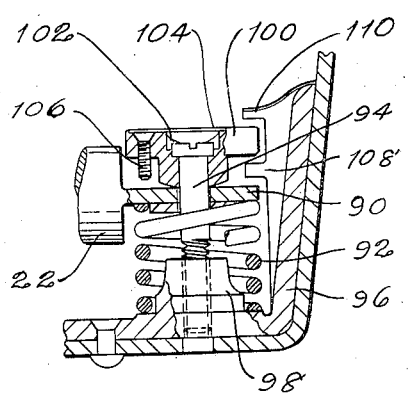
Figure 16:
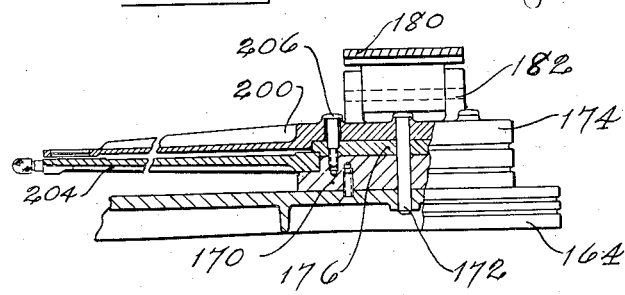

Fig. 4 is an enlarged side view of the test head with the shell body broken away to show the interior construction, Fig. 5 is a view showing the manner of detachably securing the test head to the supporting frame, Fig. 6 is a diagrammatic view of the electric circuit, Fig. 7 is a graph showing the relation of the current developed by the electric circuit as compared with the candlepower tested, Fig. 8 is a detail perspective view of the mounting for the level indicating device showing the manner of regulating the same from a remote control, Fig. 9 is another view of the mounting for the level indicating device, Fig. 10 is a detail view of the control knob for the level indicating device showing its association with a handle of the test head, Fig. 11 is a view of a modification of the control knob for the level indicating device, Fig. 12 is a top plan view of the dial associated with the level indicating device, Fig. 13 is a front view of the test screen, Fig. 14 is a side view of the test screen showing the manner of mounting the same in the test head and the support of the light sensitive cell against the rear face of the screen, Fig. 15 is a top view of the test head support showing the means employed for measuring the turning movement of the test head from right to left, Fig. 16 is a cross-sectional view of the means shown in Fig. 15 for measuring the turning movement of the test head, Fig. 17 is a view of the dial face associated with the control for correcting the readings for the inclination of the floor, and Fig. 18 is a detail view of the control referred to in Fig. 17.

Referring in detail to the drawings, the headlight testing head proper is generally indicated at 10. In Figure 1 it is shown supported from the floor by a frame or standard generally indicated at 12. The test head is demountably supported on the frame 12 and may be readily detached from the frame and used portably to measure certain factors of headlight illumination. As is apparent in Figures 1, 2 and 3, the test head is housed within a novel shaped housing or casing of tubular formation opened at one end but tapering to a rounded closed extremity at the other end. The casing is made up of two components, the primary shell 14 having its tapered extremity and a ring shaped member 16 secured to the opened end of shell 14.

The shell 14 is provided in its bottom side with means for quickly attaching the test head to the frame for support in upright position. The top of the shell 14 is buttressed upwardly to form a subsidiary housing 18 for an electric meter. Forwardly of the meter housing, the shell is depressed to form a longitudinal recess 20 in which is protectingly mounted a level indicating device 22 of the bubble level type and a dial 24 which is partially exposed to view.

Within the testing head, as shown in Fig. 4, a light condensing lens 26 is mounted in the open end of the shell 14. The focal plane of the lens falls within the shell adjacent the closed end thereof. Mounted in the closed end of the shell in the focal plane of the lens is a combination visual and electrical testing screen 28. The screen is visible from the outside of the shell through windows 30 provided in projecting cowls 31 on opposite sides of the shell. A headlight beam directed through the lens will be condensed to a spot of light on the screen.

To enable the testing head to be used portably to measure certain factors of headlight illumination, the head is provided with handles 32—32 projecting from opposite sides of the shell 14. These handles enable the shell to be held in the hands of the operator before a headlight. Associated with one handle is a control knob 34 so located that it may be manipulated by the fingers of the hand which grasp the handle. This enables the operator to continue to support the test head while adjustment of testing instrumentalities are made.

The test head illustrated herein is capable when portably used to indicate the inclination of the headlight beam and particularly to measure the position or height of the beam at a given distance ahead of the automobile. Comparison of this height with the height of a properly adjusted headlight will indicate the amount of adjustment necessary to obtain the most efficient headlight illumination within legal requirements.

A headlight beam condensed by the lens 26 will fall upon the screen 28. The screen as shown in Fig. 13 is provided with vertical and horizontal cross lines 36 intersecting each other on the axis of the lens. The center of the screen is cut out along the cross lines for a short distance on opposite sides of their point of intersection to form a cross-shaped aperture 38 as shown in Fig. 13. Formed on the front face of the screen in any desirable way is a graph 39 indicating by reference numerals a number of inches above and below the horizontal line 36 and to the right and left of the vertical line 36 at a given distance in front of the headlight tested. A light sensitive electrical plate or cell is disposed behind the screen across the aperture 38. This cell is adapted to generate an electric current in proportion to the intensity of the light impressed thereon. The cell is electrically associated with a meter 40 contained in the projecting subsidiary housing 18 previously described. The meter includes a pointer 42 swingable across a scale 44 on the dial and adapted to indicate by the extent of its swing the amount of light condensed by the lens 26 on the center of the screen 28. The circuit including the meter 40 and the light sensitive plate is shown diagrammatically in Fig. 6. The details of this circuit will be described hereinafter in connection with the mounting of the testing screen in the shell 14 and the relation of the resistance in the circuit to the character of the light sensitive cell.

In portable use, the operator manually supports the test head in front of a lighted headlight and bodily shifts it until he notes when the maximum deflection of the pointer occurs. This indicates that the headlight beam condensed by the lens is falling directly on the center of the test screen and the lens center and screen are in axial alignment with the center of the headlight beam. To determine the inclination of this headlight beam, the bubble level device 22 and dial 24 are adjusted in the manner described hereinbelow.

The bubble level device 22, previously described, is mounted in the recess 20 of the test head for pivotal movement in a vertical plane coextensive with the vertical plane through the axis of the lens 26. Movable proportionally with the bubble level device is an indicator which denotes the amount of inclination of the bubble level device. The readings associated with this indicator are zeroized when the bubble level device and the axis of the lens are parallel to one another. In such position the bubble in the leveling device will be centered when the axis of the lens is projected horizontally. The readings above referred to may be in degrees or in inches. In the present embodiment of the invention the readings of the indicator associated with the bubble level device show the striking point of the headlight beam in inches above or below the level of the headlight tested at twenty-five feet in front of the automobile. The readings may be modified for different distances. To adjust the bubble level device relative to the test head, the control knob 34 previously referred to is mechanically connected to the bubble level device in a novel way.

Referring in detail to Figs. 8, 9 and 10, the forward end 50 of the bubble level device 22 is adjustably supported relative to the bottom of the recess 20. To accomplish this adjustment while the operator is holding on to both handles 32, the knob 34 previously described is operatively connected to the end 50 of the bubble level device by a flexible cable whose rotation is transferred to a linear motion for raising or lowering one end of the bubble level device. At the same time the level device is adjusted in this manner, the dial 24 rotates proportionally to the amount of tilt imparted to the level device. The readings of the dial are made through an opening 52 formed in a plate 54 which overlies an opening in the bottom of the recess 20.

The control knob 34 is rotatably supported in the wall of the shell 14 in any suitable way. This may be accomplished by a sleeve 56 having an external flange 58 extending through the shell and fastened in place by a nut 60 threaded thereto. Washers 61—61 may be provided on opposite sides of the shell wall. A flexible cable 62 is fixed at one end to the control knob and at the other end to a rotatably mounted sleeve 64 mounted below the dial 24. A set screw 66 secures the end of the cable 62 in fixed relation thereto. A flexible sheath 68 of customary design encloses the cable between the control knob and the sleeve 64. Similar supporting members 70 for the opposite ends of the sheath secure their respective ends to the knob support and to a bracket support 72 below the dial 24. One end supporting member 70 is threaded to the sleeve 56, while the other member 70 is threaded to a hollow externally threaded element 74 extending through the bracket 72 and supported thereon by a nut 76 in the manner shown. The opposite end sections of the bracket 72 extends upwardly on opposite sides of recess 20 for securement to the under side of shell body 14.

To transfer the rotatable movement of the cable to up and down movement of the end 50 of the bubble level device, sleeve 64 is hollowed out and internally threaded to receive a post or bolt 78 threaded thereto. The upper half of post 78 projects into the recess 20 and is forked at its top end to receive the end 50 of the bubble level device. The end 50 is flattened in a vertical plane to enter between the forked sections of the post 78. A pin 80 pivotally connects these parts together so that as the post 78 rises or falls the bubble level swings about its attachment to the test head at the other end. The flattened vertically extending end of the bubble level device prevents the post 78 from rotating. As a result, rotation of the sleeve 64 relative to the post will cause the latter to raise or lower relative to the bottom of recess 20 depending upon which direction the sleeve is rotated.

Sleeve 64 is flanged at its upper end at 82. Fixed to the top of this flange is the dial member 24 previously referred to. As shown in Fig. 8 the dial carries reference numerals 84 which as it is rotated appear successively in view in the opening 52. These numbers as previously described indicate in inches above or below the level of a headlight where the beam would strike at a distance of twenty-five feet in front of the motor vehicle.

The dial 24 is preferably composed of translucent material and the reference numbers 84 are preferably opaque. Light condensed by the lens 26 in the interior of the shell 14 will form an illuminated background for the translucent dial and will throw the opaque reference numerals into sharp relief as they pass across the opening 52. The dial is thus self-illuminated without any special provision for that purpose.

Fig. 11 shows a modification of the control knob for regulating the adjustment of the bubble level 22. Here the control knob 86 is mounted on the right hand handle 32 at the forward connection of the handle to the shell body. The control knob 86 is rotatably journaled about this end of the handle and is mechanically connected as shown to the cable 88. The control knob like the modification of the knob previously described can be operated by the fingers of the hand grasping the handle.

The rear end 90 of the level indicating device 22 is also adjustable relative to the test head in order to zeroize the device with the readings on dial 24 at the time of manufacture and installation and also to enable the device to be adjusted to compensate for the inclination of the floor upon which the automobile subject to the test is standing. This last feature eliminates the necessity of providing a level floor section for supporting the automobile during the tests.

As shown in detail in Fig. 18, the rear end of the bubble level device 22 is flattened horizontally so that it forms a seat for one end of a coiled spring 92. This spring encircles a post 94 projecting through an aperture in the flattened end 90 of the device. Received in the rear end of the recess 20 in which the bubble level device is mounted and conforming to the floor and the back wall thereof is an angularly shaped member 96 riveted or otherwise secured to the test head. Formed integrally with this member is a projection 98 interiorly threaded to receive the threaded extremity of the post 94. The type of thread should have the same pitch diameter as the thread used on the forward adjusting post 78 so that similar adjustments of either one or both ends of the bubble level may be made in a test. The bottom end of the coiled spring 92 encircles the projection 98 and seats on the bottom of the recess 20 as shown.

The top of the post 94 is headed and grooved to receive an adjusting implement such as a screw driver. A knob 100 is attached to the top end of the post and is centrally recessed so that the head of the post is depressed therewithin. The knob is brazed to the post such as by solder 102 in the recess in which the head of the post is positioned, but before this assembly operation is performed the post is adjusted by a screw driver so that the zero reading on the dial 24 appears when the bubble in the leveling device is centered. After this presetting operation, the solder 102 is poured in and secures the knob 100 permanently to the post. The dial plate 104 shown in Fig. 17 is now secured to the top of the knob by set screws or otherwise.

One of the set screws 106 may be overly long so that it projects through the bottom of the knob. This set screw is capable of striking one side or the other side of a projection 108 on member 96 when the knob is rotating, thus serving as a stop limiting the amount of rotation of the knob to substantially one revolution. The bottom end of the knob 100 bears upon the top side of the end 90 of the bubble level device and when the knob is rotated in one direction forces the end 90 down against the coiled spring. The spring resiliently supports the end 90 against the knob and raises it with the knob when the latter is rotated in the other direction.

The dial plate 104 carries reference marks indicating the number of degrees plus or minus that the bubble level device is inclined relative to the true horizontal. Formed integrally with the member 96 is a projection 110 which overlies the knob and serves as a pointer for making readings from the dial 104. The plus and minus signs designate in which direction the bubble is inclined. If the inclination of the floor level is known, adjustment of the knob 100 to the degree of inclination of the floor will automatically compensate the readings of dial 24 for this irregularity.

As previously described, the testing screen 28 is supported in upright position in the focal plane of the lens. This is accomplished by providing the shell 14 with an inturned sleeve-like portion 112 to the inner end of which is secured a circular insulated block 114. As shown in Fig. 14, this insulating member is attached to the sleeve portion 112 by bolts 116. The heads of the bolts 116 are countersunk in the insulating member. Secured to the heads of these bolts as by brazing or in any other suitable way is the test screen 28. The screen is preferably a metal plate of electrically conductive composition for the purpose to be described hereinbelow.

The insulating member is recessed at 118 and carries therewithin against the back side of the screen the light sensitive electrical cell or disc 120 previously referred to. This disc is of the dry-disc photocell type capable of developing a difference of electrical potential between its opposite faces depending upon the difference in light falling thereon. The disc is resiliently supported against the screen by a coiled spring 122. This spring forms a part of the electric circuit for conveying current generated by the disc 120. The opposite end of the coil spring seats upon an electrical conductive washer 124 which is secured to the base end of a terminal post 126. One of the bolts 116 may form the other terminal post of the circuit or, as shown in Fig. 6, a special post 128 may be provided which extends through the insulating member into electrical contact with the screen. Leads 130—130 are provided for connecting the terminal posts with the electric meter 40 as shown in Fig. 6. The circuit from the light sensitive element 120 to the meter 40 is thus complete.

A variable resistance is provided in the meter circuit in order to initially preset the meter in proper relationship to the cell 120 so that the pointer in the meter indicates the proper intensity of light received on the cell. The variable resistance is preferably connected in parallel in the circuit as indicated at 132 in Fig. 6. The resistance is adjusted at the time of the manufacture of the apparatus when its test head is subject to final inspection and comparison with a standard. The resistance utilized in the present embodiment of the invention also serves another useful novel function. It is so arranged that it is capable of causing the pointer in the meter to swing in substantially linear proportion to the intensity of the light received by the cell for a part of its distance of movement and to swing at a diminishing rate in proportion to the light received by the cell for the remainder of its movement. By selecting a resistance of such a character, it is possible to cover a wide range of candle powers on a relatively small meter scale 44 and yet spread out the average useful range of the scale for average tests. This is accomplished by selecting an electrical resistance of certain value which takes advantage of the natural output character of the dry cell type of photocell utilized herein. The resistance selected should give in combination with a particular cell and with a particular meter a curve of the shape plotted in the graph in Fig. 7.

Referring to Fig. 7 in detail, the resistance selected is such that in proportion to the increase in candlepower received by the cell, the increase in the current of the meter circuit is first in a linear proportion and then for higher candlepower it rather abruptly falls off. Thus, when the candlepower received by the cell is plotted against the amperage delivered, the graph shows a curve similar to that shown in Fig. 7. The usual range of headlight candlepower is between 10,000 and 20,000 candlepower. When the resistance is properly selected, the proportion of the current generated to candlepower received will be substantially linear in the average useful range as shown on the graph between A and B. From B on to C on the graph, the curve inclines rather sharply upward at an increasing rate. This last section of the curve is approximately logarithmic. The pointer in the meter swings in proportion to the amount of current in the circuit. It is thus seen that the pointer will swing in linear proportion to the light measured over the greater part of its range of movement and then swing at a continuously decreasing rate per candlepower for the remainder of its range of movement. The scale 44 associated with the meter is marked correspondingly. The average useful range from zero to 20,000 candlepower extends over more than half of the length of the scale. The remaining part of the scale contains readings for candlepower between 20,000 and 90,000 or any other relatively high figure which may be desired. Thus by selecting a resistance which takes advantage of the natural output of the cell, it is possible to make readings from very low candlepower to very high candlepower and at the same time spread out the readings for candlepower of average headlight beams so that detail readings of the average headlight beams can be made.

The rear end of the shell 14 is opened to facilitate assembly of parts. A cylindrical concave cap 134 conforming to the taper of the shell body is secured over this opening. To accomplish this, a bracket 136 having an offset central section is secured at its opposite ends by the bolts 116 to the inturned sleeve 112 as shown in Fig. 14. A bolt 138 extends between the bracket and the cap 134 and secures the two together by means of a nut as shown.

The lens 26 is supported in any desirable way such as by a ring-shaped member 140 having an offset inner edge forming a seat for the lens. Pressing against the outside of the lens and securing the same in position is a circular bead 142 of yieldable material secured to the inner circular edge of a ring member 144.

Likewise secured to the front edge of the test head is a bead 146 of yielding material such as rubber. This bead will prevent the metallic front edge of the test head from coming into contact with the lens of the headlight and possibly damaging the same. When the test head is used portably, the front beaded edge is pressed against the headlight lens and in this manner assists in supporting the test head in proper alignment. The bead 146 is circular in formation and approximately the diameter of the usual headlight lenses. When pressed against the front of a headlight lens it serves by its position on the lens as a guide for aligning the test head in proper position in front of the headlight.

The frame generally indicated at 12 for supporting the test head comprises two uprights 150 and 152 secured at their lower ends in the base plate 154 and joined together at their upper ends by a housing 156. The uprights are preferably hollow cylindrical elements. The base as shown is movably mounted on a track 158 by rollers 160. In use this track element is disposed transversely across the front of an automobile so that the base and the uprights carried thereby may be shifted from one side to the other of the vehicle.

Slidable on upright 152 is a sleeve 162 having on one side a lateral support 164 upon which the test head is removably secured and on the other side a lateral support 166 embracing the upright 150 and prevent the sleeve 162 and associated parts from turning. In the housing 156 at the top of the uprights a mechanism is provided for counter-balancing the weight of the test head and its support on upright 152. This mechanism comprises a coiled element of flexible material 168 having one end extending downward from the housing and attached to the top of the sleeve 162. This coiled element is tensioned to wind upon itself. Frictional braking means is provided in the housing bearing upon the coiled element and acting to hold the same in adjusted position.

Fixed to the top of the lateral support 164 is a supporting block 170. Extending through this block as shown in detail in Fig. 16 is a vertical pivot pin 172. About this pivot pin is journaled a supporting bar 174 separated from the supporting block by a friction washer 176 whose function will be described hereinafter. Superimposing this bar is a second bar 180. As shown more clearly in Fig. 5, one end of the top bar is pivoted to the lower bar at 182 while the other end of the upper bar is adjustably supported relative to the lower bar by a screw 185 controlled by a hand wheel.

The test head is secured to the top bar 180 for quick detachment. The lower side of the shell 14 is provided with a longitudinally extending bracket member 184 having upturned ends secured to the shell. The front upturned end of this bracket member is slotted to receive a tongue 186 on bar 180 in the manner shown in Fig. 5. The rear upturned end of the bracket member is apertured to receive a pin 188 on the flexible element 190. The flexible element is spaced from the tongue 186 a distance such that after the tongue is fitted into the bracket member and then the rear end of the test head lowered, the pin 188 on the flexible element will snap into the aperture provided therefor. Depressing the upper rearward extending section of the element 190 will withdraw the pin as is closely apparent. The spaced projections 192 on bar 180 bear against the sides of the bracket member 184 and serve to keep the test head from shifting upon the bar.

In order to rotate the test head about the vertical pivot pin 172 and to hold the same in adjusted position, a screw 194 supported from the fixed block 170 by a rearwardly projecting shelf 196 is threaded through a rotatable depending element 198 on the lower bar 174. It is obvious that depending on which way the screw is rotated the bar 174 and the test head carried thereon will rotate about the pivot pin 172 either to the right or to the left. The threaded engagement between the screw and element 198 will act to hold the parts in adjusted position. The opposite ends of the screw may be provided with hand wheels or knurled knobs to facilitate rotation.

As shown in Figs. 15 and 16, a pointer member 200 is formed integrally with the bar 174. This pointer projects toward the upright 152 and is adapted to sweep over a scale 202 carried on a similarly projecting member 204 disposed therebelow. The end of this member opposite the scale 202 is shaped in the form of a ring and is seated on a circular shoulder formed on the block 170 as indicated in Fig. 16. The friction washer 176 overlaps upon the top side of the ring-shaped end of member 204. Bolts 206 secure the washer to the block 170 and their adjustment will vary the frictional engagement between the scale member 204 and the washer. The bolts extend through arcuate slots in the bar 174 as shown in Fig. 15 in order to allow turning movement of the latter. Normally the scale member 204 is held from movement by the frictional engagement of the washer. It will, however, yield to manual forces. The adjustability of the scale member eliminates the necessity of disposing the track 158 in exactly perpendicular relationship to the longitudinal median line of the motor vehicle as will be more fully pointed out hereinafter. If desired, the pointer member 200 instead of the scale member may be frictionally held against movement except when manually adjusted. Either form of adjustment will suffice. The scale preferably carries scale readings in degrees and in inches. The inches are calibrated to read the amount of deflection of the headlight to the right or to the left at a given distance in front of the motor vehicle. A standard distance of measurement is twenty-five feet.

The testing head carries sighting means for aligning the head in proper relationship to the longitudinal median line of the vehicle. This sighting means may be in the form of notched sights carried in alignment on top of the shell body 14. As shown, the front sight 208 may be mounted on the top of the shell 16 substantially over the condensing lens 26. The rear sight 210 may be mounted on the top of the meter housing 18 as shown.

When the test head is used portably it is capable of measuring the inclination of the headlight beams. As previously described, the operator grasps the handles 32—32 and brings the cushioned front edge of the test head up against the lens of the headlight tested. If the inclination of the floor upon which the automobile is supported is known, the knob 100 may be adjusted to compensate for this before the test is made. By judiciously shifting the test head around, the operator can guide the condensed headlight beam directly on the center of the screen. This can be watched visually through the windows 30 in the cowls 31 and may be checked by ascertaining when the maximum deflection of the meter pointer 42 occurs. When the test head is adjusted to this position, the operator can by controlling the knob 34 with his fingers vary the inclination of the bubble level device until the bubble therein centers in the glass. This movement rotates the dial 24. The number appearing in the center of the opening 52 indicates the number of inches either above or below the level of the headlight tested where the headlight beam strikes at a standard distance in front of the vehicle, as for example, twenty-five feet. The numbers on the dial 24 indicating deflection of the beam below the level of the headlight may be colored differently to distinguish from those numbers indicating upward deflection of the beam.

The portable use of the test head is particularly desirable in automobile service stations. It enables the station attendant to make a preliminary examination without requiring the driver of the automobile to drive to any particular place in the station. If the preliminary examination warrants a more thorough examination, the automobile may be driven up in front of the supporting frame 12.

In use on the supporting frame 12, the test head should be properly oriented so that the axis of the condensing lens extends parallel to the longitudinal median line of the motor vehicle. This is accomplished by sighting the test head on some portion of the vehicle which is parallel to the median line such as along the top of the hood. The frame 12 may be rolled along the track 158 and the support for the test head raised or lowered on the upright 152 to dispose the test head in position for sighting. After the test head is properly sighted on the motor vehicle the scale readings on the member 204 are zeroized with reference to the pointer 200 by manually shifting the scale member 204 about the axis of the pivot pin 172. After such adjustment has been made the test head is shifted to a position in approximate alignment with one of the headlights of the motor vehicle.

To bring the test head in exact alignment with the headlight, the test head is adjusted by the screws 184 and 194 until the condensed headlight beam falls directly on the center of the screen 28. To ascertain in which direction the adjustments should be made the screen can be watched through the windows 30. The deflection of the meter needle 42 serves as a check on the visual examination of the screen. When the maximum deflection of the needle occurs, the condensed beam falls exactly on the center of the screen and the axis of the beam and the lens coincide. The reading on the scale 202 will indicate the lateral deflection of the headlight beam in degrees and in inches at twenty-five feet in front of the automobile. To find the vertical inclination of the headlight beam, the control knob 34 is adjusted as in portable use until the bubble is centered in its glass. The reading on the scale 24 will then indicate the point where the center of the beam will strike at a distance of twenty-five feet in front of the motor vehicle. As in the case of portable testing, the correction for the floor level may be made by adjusting the knob 100 on the rear end of the bubble level device. The scale on the meter 40 is marked to indicate candlepower. The maximum deflection of the meter needle 42 in each test will also indicate the candlepower of the headlight beam.

What I claim is:

1. In a headlight testing head, a spherical convex light condensing lens having a diameter substantially equal to the diameter of the headlight to be tested and through which the headlight beam is directed and condensed thereby, a combined visual and electrical testing screen mounted in the focal plane of the lens, said screen having a vertical reference line and a horizontal reference line intersecting on the axis of said lens, said screen cut out in the form of a cross along said lines for a short distance on opposite sides of the point of intersection of said lines, a light sensitive element positioned to receive the light rays entering said cut-out cross and adapted to generate an electric current in proportion to the intensity of the light received thereon, and a meter electrically associated with said element and receiving the current generated thereby, said meter having a pointer adapted to indicate by its maximum deflection the time when the beam condensed by said lens falls with maximum intensity on the intersection of said reference lines.

2. A headlight testing instrument adapted for portable use comprising, in combination, an enclosure, means for admitting light into the enclosure from a headlight and concentrating the rays of light issuing therefrom to a spot of light within the enclosure, a pair of handles on opposite sides of the enclosure enabling the operator to grasp the handles with his hands and manually support the instrument in front of a headlight, a light sensitive electric element in the enclosure adapted to generate an electric current in proportion to the light falling thereon and arranged in said enclosure in alignment with said light admitting and concentrating means to receive the concentrated spot of light when the instrument is positioned in front of a headlight to receive the headlight beam thereof, an electric meter associated with said light sensitive element and having a movable member adapted to indicate by its maximum deflection when the spot of light concentrated by said means centers on said element, a level indicating device carried by said enclosure and tiltable in a vertical plane parallel to the direction of alignment of said element with said light concentrating means, means responsive to the tilting of said level indicating means for indicating the extent of such tilting movement relative to the true horizontal, and a remote control mechanism for tilting said level indicating means including a control knob disposed adjacent to one of the handles in position to be operated by the hand of the operator without removing his grasp from the handle.

3. A headlight testing instrument adapted for portable use comprising, in combination, an enclosure, means for admitting the light of a headlight beam into the interior of said enclosure and concentrating rays thereof to a spot of light in the interior of the enclosure, a screen mounted in said enclosure to receive said spot of light, said screen provided with a horizontal reference line and a vertical reference line intersecting one another and an aperture therethrough at the intersection of said lines, a light sensitive electric element disposed behind said screen in position to receive the light rays passed through said aperture and adapted to generate a current in proportion to the intensity of light received thereby, an electric meter electrically associated with said element and having a movable part adapted to indicate by its maximum deflection when the spot of light concentrated by said means falls fully on the intersection of said reference lines, a handle on the enclosure for the operator to grasp and manually support the instrument in front of a headlight, a bubble level device carried by the enclosure viewable from the outside and tiltable in a vertical plane parallel to the alignment of the screen with the light concentrating means, a reference indicating scale carried by the bubble level, means responsive to the tilting movement of the level device for moving said scale in proportion thereto, a control knob on the outside of said enclosure disposed adjacent the handle in position to be controlled by the fingers of the operator as his hand grasps the handle to support the instrument, means operatively connecting the control knob with the bubble level device and adapted upon turning movement of the knob to tilt the device, and an opening in the enclosure for viewing the screen and noting the location of the spot of light with respect to the reference lines and the aperture, said electric meter indicating by the maximum deflection of the movable member associated therewith when the spot of light is centered on the aperture in the screen and serving in this manner as a check on the visual estimation of the position of the spot of light on the screen.

4. A headlight testing apparatus adaptable for portable use comprising, in combination, an enclosure, a screen in the enclosure, means carried by the enclosure in alignment with said screen adapted to concentrate scattered rays of a headlight beam to a spot of light on the screen, said screen having a horizontal reference line and a vertical reference line intersecting one another and cut away along these lines adjacent their point of intersection to form an aperture substantially in the form of a cross, a light sensitive electric circuit including an element disposed behind the screen over the cross shaped aperture thereof and adapted to generate a current of electricity in proportion to the light received thereby and also including an electric meter exposed to view and adapted to indicate by the deflection of a movable member the intensity of light received by the element, a pair of handles on the opposite sides of the enclosure enabling the operator to grasp the same and manually support the enclosure in front of a headlight, a bubble level exposed to view and mounted with its longitudinal axis parallel to the direction of alignment of said screen with said light concentrating means, means mounting said bubble level on the top side of said enclosure for tilting movement in the vertical plane containing its longitudinal axis, means for measuring the tilt of said bubble level device relative to the direction of alignment of said screen and said light concentrating means, and remote control means for tilting said bubble level device including a control knob so positioned adjacent one of said handles that the operator may grasp the handles with both of his hands to support the apparatus in front of a headlight and at the same time adjust the control knob with his fingers, the light sensitive electric circuit serving during the test to indicate by the maximum movement of the member associated with the meter when the light rays concentrated by said light concentrating means are centered upon the intersection of said reference lines on the screen.

5. A headlight testing instrument adapted for portable use comprising, in combination, an enclosure open at one end, means in the opening of said enclosure for concentrating a part at least of a headlight beam to a spot of light in the enclosure, means in the enclosure in alignment with said light concentrating means upon which the spot of light concentrated by the latter is arranged to be received in the testing of the headlight beam, a bubble level device exposed to view on the wall of said enclosure and arranged parallel with the alignment of said light concentrating and light receiving means, means mounting said bubble level device for tilting movement in a vertical plane parallel to the alignment of said light concentrating and light receiving means, means for tilting said bubble level device, a dial for measuring the degree of tilt of the bubble level device, means for moving said dial in response to the tilting movement of the bubble level device, said dial composed at least in part of light permeable material and mounted on the enclosure so that the light permeable part thereof projects across an opening in said enclosure whereby when a headlight beam is concentrated within the enclosure it forms a lighted background illuminating the dial.

6. A headlight testing instrument comprising, in combination, an elongated housing closed on all sides and at one end but having an opening at the other end thereof, a spherical convex light condensing lens fixed in said opening and adapted to condense a beam of light directed thereagainst to a focus within the enclosure adjacent to the closed end thereof, a light sensitive electric element disposed in the closed end section of the housing on the axis of said lens at substantially the focal length thereof, means exposed to view on the housing for indicating the intensity of the light received on said element, a pair of handles on said housing projecting from opposite sides thereof so that the same may be manually supported in front of a headlight of a motor vehicle, means for indicating an inclination of the axis of the lens means for adjusting said last means to various inclined positions in a vertical plane parallel to the axis of the lens, means for indicating the degree of such adjustment relative to the axis of the lens, and means for controlling the operation of said adjusting means from a point adjacent to one of said handles whereby the operator may grasp the handle to manually support the instrument and at the same time control the operation of said indicating means.

7. Apparatus for testing headlights of a motor vehicle comprising, in combination, a stand, a test head including an enclosure opened at one end for the admission of a headlight beam, means in the interior of said enclosure predisposed in alignment with the opening of the enclosure and adapted to test a headlight beam admitted through the opening with the axis thereof co-extensive with the alignment of the testing means, means for indicating the inclination of the head in the vertical plane through the aligned testing means, a mounting on the stand for said test head, means for raising and lowering said mounting and for rotating said mounting about a vertical axis and a horizontal axis, and means for detachably securing the test head upon said mounting with the vertical plane through said testing means extending through said vertical axis of rotation and perpendicular to said horizontal axis of rotation, said last means including a member resiliently urged in one direction to hold the test head upon the mounting but yieldably retractable to allow removal of the test head from the stand.

8. A headlight testing instrument comprising, in combination, an enclosure opened at one end for receiving a headlight beam for testing purposes, a level indicating device exposed to view on the enclosure, means mounting said device for tilting movement in a vertical plane parallel to the light beam of a headlight properly admitted through said opening for testing purposes, control means for tilting said device, scale means including a dial and a pointer operatively associated with said control means and adapted to indicate the extent of the tilting movement imparted to said device, said scale being composed in part at least of light permeable material and mounted on the enclosure so that said light permeable part projects across an opening in the enclosure whereby when a headlight beam is admitted into the enclosure it serves to form a lighted background for the dial.

9. A device for testing the headlights of a motor vehicle including, in combination, a spherical convex lens for condensing the headlight beam of light to a spot of light, a combined visual and electrical testing screen erected across the axis of the lens in substantially the focal plane thereof, said screen having a horizontal and a vertical cross line intersecting on the axis of the lens forming a target for visually aligning the headlight beam condensed by said lens on the screen, a common support for said lens and said screen associating the same together into a unitary structure and adapted to be disposed in testing position in front of a headlight so that the lens condenses the headlight beam upon the screen for a visual test of the aim of the headlight beam, said screen also having an aperture therein at the point of intersection of said cross lines, and a light sensitive electrical device for indicating light intensity including a light sensitive element arranged to receive light rays passing through the aperture in said screen and adapted to generate a current in proportion to the light received thereon, said device also including an electric meter in circuit therewith having a pointer adapted to indicate by its maximum deflection when the headlight beam condensed by said lens is directly centered on the intersection of said lines, said electrical device thus serving as a check on the visual alignment of the lens and screen with the headlight tested.

10. A headlight testing instrument comprising, in combination, an elongated enclosure opened at one end, a spherical convex light condensing lens mounted in said opening and adapted to condense a headlight beam to a spot of light, a light sensitive electric element disposed in the opposite end of the enclosure on the axis of the lens at substantially the focal point thereof and arranged to receive equal portions of the spot of light condensed by the lens above and below the axis of the lens, an electric meter exposed to view on said enclosure and electrically connected to said element for registering the intensity of the light received thereon, said meter having a movable member adapted to indicate by the maximum deflection of its position when a headlight beam condensed by said lens falls directly on said element, a bubble level indicating device likewise mounted on said enclosure in exposed condition and parallel to the axis of the lens, means for tilting said bubble level device in a vertical plane parallel to the axis of said lens, and means movable in response to the tilting adjustment of said bubble level device for indicating the extent of inclination of the same relative to the axis of the lens, said bubble level device and associated means cooperating with said light sensitive element and associated meter to electrically determine the vertical aim of the headlight beam.

11. An instrument for testing the headlight of a motor vehicle including, in combination, a spherical convex lens for condensing the headlight of a motor vehicle to a spot of light, a testing screen having an intersecting horizontal line and a vertical line, a common support for said lens and said screen predisposing the same in a fixed relation with respect to one another so that the screen extends across the axis of the lens at substantially the focal length thereof with the horizontal and vertical lines intersecting on the axis of the lens, said intersecting lines on the screen forming a target for visually aligning a headlight beam condensed by the lens with the axis thereof, a light sensitive electrical element positioned to receive the light rays of the condensed headlight beam striking the point of intersection of said lines and adapted to vary an electric current in proportion to the light so received, and a meter electrically associated with said element having an indicator adapted to determine by its maximum deflection when the headlight beam condensed by said lens is aligned with the axis thereof and directly centers on the intersection of said lines, said light sensitive element and meter thus serving as a check on the visual alignment of the lens and screen with the headlight tested.

12. A headlight testing instrument comprising, in combination, a lens for condensing a headlight beam to a spot of light, a level indicating device, an electrical means for testing the aim of the headlight beam condensed by said lens, a common support for said lens, device and electrical means maintaining the same in predisposed alignment, said level indicating device disposed to indicate the level conditions of the instrument in the vertical plane of the axis of the lens, means for adjusting said level indicating device relative to said axis, means for indicating the extent of the adjustment of said level indicating device, said electrical means including an electric meter having a movable indicator responsive to the current flowing through the meter and also including a light sensitive electric element electrically associated with the meter and disposed on the axis of the lens at substantially the focal length thereof, said element adapted to vary the current flow through the meter in proportion to the intensity of the light received thereon and so arranged that it receives equal portions of the spot of light formed by the lens both above and below the axis of the lens, whereby said instrument when disposed in alignment in front of a headlight is capable with the aid of said electrical means and said level indicating device of determining the aim of the headlight beam in the vertical plane of the axis of the lens.

13. A headlight testing instrument adapted for portable use comprising, in combination, an enclosure having an opening in one end thereof, means in the opening of said enclosure adapted to concentrate light rays of a headlight beam into a spot of light in the interior of the enclosure, means in the interior of said enclosure predisposed in alignment with said light ray concentrating means and adapted to indicate when the instrument is positioned in front of the headlight so that the beam thereof enters the opening in the enclosure with its axis coincident with the direction of alignment of the said two means, a handle on the enclosure for manually supporting the instrument in front of a headlight, a level indicating device mounted on the enclosure and exposed to view, means mounting said level indicating device for angular adjustment in a vertical plane parallel to the direction of alignment of said two means, means for indicating the extent of angular adjustment of said level indicating means with respect to the direction of alignment of said two means, and remote control means for adjusting the tilt of said level indicating device including a control member disposed adjacent to said handle in position to be operated by the hand of the operator grasping the handle.

14. A headlight testing instrument comprising, in combination, a testing head, aligned elements carried thereby adapted to indicate when the head is positioned in front of a headlight with the axis of the beam thereof coincident with the direction of alignment of the elements, holding means carried by said head which may be grasped by the hand of the operator for manually holding the head before a headlight, a level indicating device mounted on the head for angular adjustment in a vertical plane parallel to the direction of alignment of said elements, means associated with said head for adjusting the angular setting of the device in said vertical plane, a member operatively associated with said adjusting means and movable in response thereto, a scale associated with said movable member and calibrated to indicate the vertical aim of a headlight beam, said scale having a zero reading which when said device is adjusted so to read will indicate whether the direction of alignment of said elements is level, said movable member and associated scale being adapted when the device is adjusted to a level indicating condition to indicate the amount of inclination of the direction of alignment of said elements, and a mechanical remote control connection operatively connected to said adjusting means including a control knob associated with the head disposed within reach of the fingers of the operator's hand grasping said holding means for regulating the angular setting of said device.

15. A portable headlight testing instrument including, in combination, a testing head, spaced means carried thereby disposed in alignment and adapted to indicate when the head is positioned in front of a headlight with the axis of the beam thereof coincident with the direction of alignment of the spaced means, a level indicating device for indicating level or unlevel conditions in a vertical plane parallel to the direction of alignment of said spaced means, means mounting said device on the head for adjustment to various angular settings relative to the head in said vertical plane, means carried by the head for indicating the extent of angular adjustment of the device, means associated with the head which may be grasped by the operator to manually support the head in front of a headlight, a control member associated with the head disposed adjacent said supporting means within reach of the hand of the operator gripping the same, and mechanism operatively coupling said control member with said indicating device and enabling the operator to grip said hand grasping means to support the head in front of a headlight and at the same time regulate the adjustment of said device.

16. A portable headlight testing instrument comprising, in combination, a housing generally closed against the admission of light but provided with an opening in one end thereof, a light condensing lens in the opening of said housing adapted to concentrate light rays of a headlight beam into a spot of light in the housing, light receiving means in said housing disposed on the axis of the lens at substantially the focal length thereof for indicating the direction of the light beam axis with reference to the axis of said lens, hand engaging means on said housing for manually carrying and supporting the same, a level indicating device mounted on the housing remote from said hand engaging means and arranged in a vertical plane parallel to the axis of the lens, means for tilting said device in its vertical plane, means for indicating the degree of tilt of said device in its vertical plane relative to the axis of the lens, and remote control means extending from said hand engaging means to said tilting means, said control means including a movable control member adjacent said hand engaging means enabling the operator to simultaneously support the instrument by the hand engaging means and adjust the device.

17. A headlight testing instrument comprising, in combination, a housing open at one end, means in the open end of the housing for concentrating rays of a headlight beam directed thereinto to a spot of light in the interior of the housing, a screen in the interior of the housing intercepting the spot of light formed by said light concentrating means, said screen having an opening therein so aligned with said light concentrating means that the spot of light of a headlight beam is centered on the opening when the housing is in a predetermined position relative to the axis of the headlight beam, means on the housing for indicating the inclination of the direction of alignment between the opening in the screen and the light concentrating means relative to a horizontal plane, means for adjusting said indicating means to various angular settings in a vertical plane parallel to the direction of alignment of said light concentrating means and the opening in the screen and for indicating the extent of the angular adjustment of said indicating means relative to said horizontal plane, means on the housing which may be grasped by the hands of the operator to manually hold the instrument in front of a headlight for testing purposes, a light sensitive electric element mounted to receive light entering said opening in the screen and adapted to vary an electric current in proportion to the light received thereon, a meter electrically connected in circuit with said element and mounted on the housing so that it may be viewed from above by the operator holding the housing, said meter including a movable member therein adapted to indicate to the operator by its maximum deflection when the spot of light concentrated upon the screen centers upon the opening in the screen.

18. Mechanism of the class described comprising, in combination, a portable testing head, a light condensing lens element carried by the testing head, a light receiving screen element carried by the testing head at substantially the focal length of the lens element, the relative positions of the lens and screen elements being such that a light beam entering the testing head with its axis coincident with the axis thereof will be condensed by said lens at a predetermined point on said screen element, a level-indicating element carried by the testing head to indicate when the axis thereof extends horizontally, means carried by the testing head for adjusting one of said elements in its own plane, means for indicating the extent of adjustment of said last-mentioned element in terms indicating the angularity of the light beam tested, means on the testing head which may be grasped by a hand of the operator to assist in manually supporting the testing head in front of a light beam source, a control member on the test head in position to be operated by the fingers of the hand engaging said grasping means, and a remote control connection extending from said control member to said adjusting means enabling the operator to grasp said hand grasping means to manually support the testing head in front of a light beam source and at the same time adjust said adjustable element.

CHARLES W. MacMILLAN.